Jan. 26, 1926.  
U. F. LANDIS  
1,570,898  
CONCAVE FOR THRASHING MACHINES  
Filed Oct. 21, 1924

Inventor  
Ulrich F. Landis  
By  
Attorney

Patented Jan. 26, 1926.

1,570,898

UNITED STATES PATENT OFFICE.

ULRICH F. LANDIS, OF KIOWA, KANSAS.

CONCAVE FOR THRASHING MACHINES.

Application filed October 21, 1924. Serial No. 744,913.

*To all whom it may concern:*

Be it known that ULRICH F. LANDIS, a citizen of the United States of America, residing at Kiowa, in the county of Barber and State of Kansas, has invented new and useful Improvements in Concaves for Thrashing Machines, of which the following is a specification.

Concaves now in use on thrashing machines consist of plates having rows of teeth, the teeth of each row being staggered with those of an adjacent row, and with which the teeth on the cylinder intermesh in cracking the grain. It has been found that this construction and arrangement does not thoroughly crack the grain, therefore to insure a thorough cracking of the grain, the present invention has for its purpose to provide, in a concave for thrashing machines, a construction including plates mounted on the thrashing surface of the concave and so disposed as to cooperate in conjunction with the teeth on the concave and with the teeth on the cylinder as the cylinder rotates.

Through experiments, it has been found that by placing such plates straight, the grain is thrashed hardly more than without the plates and if the plates are disposed longitudinally of the concave, that is, transversely of the machine, the grain may be thrashed too much and, in view of these experiments, the invention aims, as another purpose, to arrange the plates in parallelism but angularly disposed, in which case the grain cooperates with the plates in conjunction with the teeth on the concave and those on the cylinder in order to cause a more thorough thrashing thereof. In other words, the grain in passing between the concave and the cylinder receives a twisting or rolling action at an angle to the concentric travel of the grain, thereby producing a more thorough breaking up of the grain, that is, a more thorough removal of the shell or husk.

Still another purpose is to provide a concave which is composed of a plurality of sections or plates, a lower forward section, an upper rear section, and an intermediate section, the intermediate section having one row of teeth with the angularly disposed grain thrashing plates while the upper rear and lower forward sections have two rows of teeth with intermediate angularly disposed grain cracking plates, the sections of the concave being removable as are also the grain thrashing plates which permits the sections of the concave to be removed and others substituted or the grain thrashing plates removed with others placed in their stead.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

Figure 1:
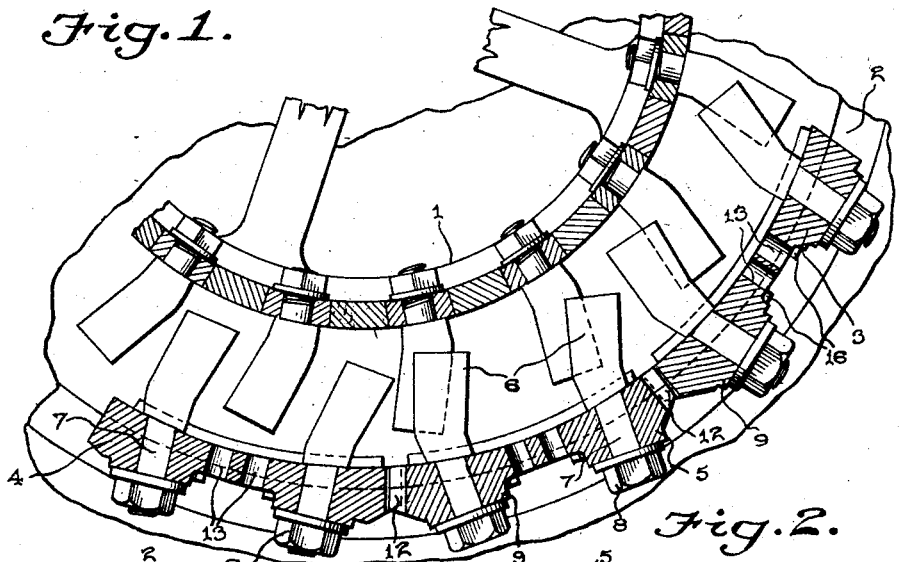
Figure 1 is a sectional view through a portion of a thrashing machine, illustrating a concave and a cylinder, the former being provided with rows of grain thrashing plates disposed at angles to the course of travel of the grain.
Figure 2:
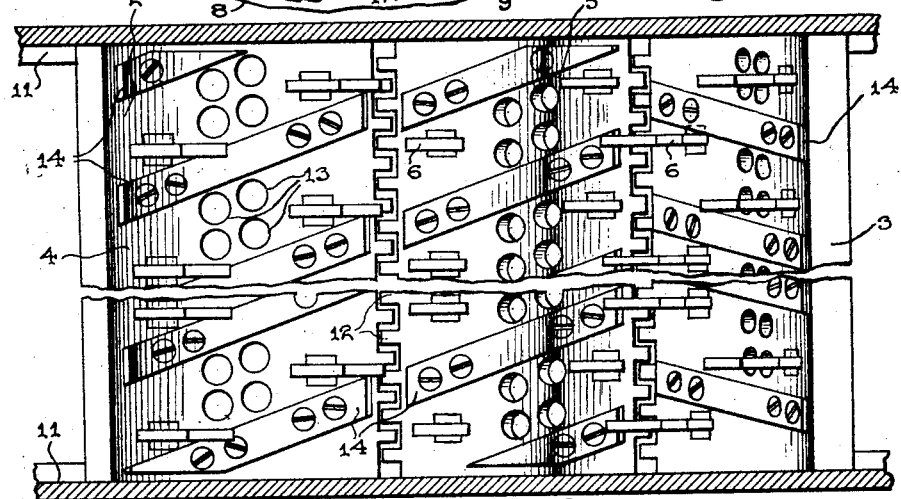
Figure 2 is a plan view of the concave, more clearly disclosing the disposition of the grain thrashing plates between the teeth.
Figure 3:
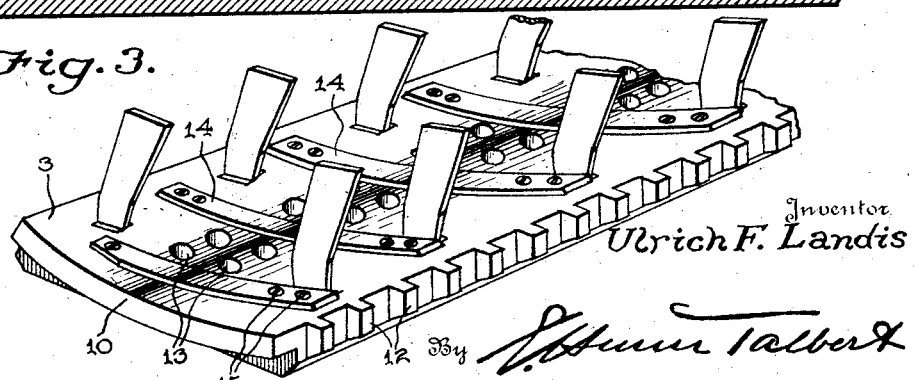
Figure 3 is an enlarged detail view of a portion of one of the concave sections, showing the teeth thereon and the grain thrashing plates.

Referring to the drawings, 1 designates the usual cylinder for cooperating with a concave 2 of a thrashing machine. In the present instance, the concave consists of the upper rear concave section 3, the lower forward concave section 4 and the intermediate section 5. The latter section is provided with one row of teeth 6 which are of the usual construction and are tapered toward their base portions and have threaded shanks 7 which pass through the wall of the concave and are secured by means of nuts 8, there being bosses 9 formed on the sections of the concave to insure a rigid mounting for the teeth.

The ends of the sections of the concave are rabbeted, as shown at 10, to engage with supports 11 at the sides of the machine for holding the sections of the concave in place. The adjacent edges of the sections of the concave have engaging lugs 12 which act to hold the sections of the concave spaced to permit the thrashed grain to pass therethrough. The sections of the concave are also provided with openings 13 between the rows of teeth which also permit the thrashed grain to pass therethrough.

Secured to the sections of the concave are grain cracking plates 14. These plates are disposed between the teeth of the rows thereof on the sections of the concave and are arranged at angles to the direction of travel of the grain. In this manner, the plates, in conjunction with the teeth of the concave and the teeth on the cylinder, act to more thoroughly crack the grain in its passage between the concave and the cylinder. The grain thrashing plates are secured to the concave by means of bolts 15 including nuts 16. While the plates are disposed angularly to the direction of travel of the grain, they are interposed between the teeth of the rows and arranged concentric with the concave.

The invention having been set forth, what is claimed is:

In a concave for thrashing machines, the combination with a cylinder, of a concave for operating with the cylinder and being composed of upper rear, lower forward and intermediate sections provided with rows of teeth, and a plurality of plates interposed between the teeth, the plates of the upper rear section being flat and disposed on angles to the faces of the teeth and the direction of travel of the grain, thereby imparting an angular twist to the grain, and the plates on the lower forward and intermediate sections also being flat and disposed on angles to the faces of the teeth and the direction of grain travel, but opposite to the first angle, thereby imparting an angular twist to the grain in the opposite direction to more thoroughly thrash the grain in its passage between the concave and the cylinder.

In testimony whereof he affixes his signature.

ULRICH F. LANDIS.